United States Patent [19]
Erickson

[11] Patent Number: 5,867,575
[45] Date of Patent: Feb. 2, 1999

[54] OPTIMIZED INTERFACE BETWEEN AUDIO/MODEM BOARD AND SOUND BOARD

[75] Inventor: Steven S. Erickson, San Jose, Calif.

[73] Assignee: Creative Technology Ltd., Singapore, Singapore

[21] Appl. No.: 546,241

[22] Filed: Oct. 20, 1995

[51] Int. Cl.⁶ .................................................. H04M 11/00
[52] U.S. Cl. ...................... 379/399; 379/90.01; 379/402; 379/406; 379/410; 379/388
[58] Field of Search ............................. 379/90.01, 93.01, 379/93.05, 93.06, 399, 402, 387, 388, 406, 410; 370/286, 537

[56] References Cited

U.S. PATENT DOCUMENTS

| | | | |
|---|---|---|---|
| 3,706,929 | 12/1972 | Robinson et al. | 375/216 |
| 4,627,046 | 12/1986 | Bellamy | 370/359 |
| 4,677,657 | 6/1987 | Nagata et al. | 455/558 |
| 4,736,406 | 4/1988 | Molnar | 379/93.14 |
| 4,799,144 | 1/1989 | Parruck et al. | 395/822 |
| 5,367,571 | 11/1994 | Bowen et al. | 380/20 |
| 5,408,614 | 4/1995 | Thornton et al. | 395/841 |
| 5,428,762 | 6/1995 | Curran et al. | 711/115 |
| 5,483,577 | 1/1996 | Gulick | 379/67 |
| 5,526,408 | 6/1996 | Yekutiely | 379/90.01 |
| 5,533,105 | 7/1996 | Brown et al. | 379/93.05 |
| 5,644,625 | 7/1997 | Solot | 379/88 |
| 5,717,742 | 2/1998 | Thomson | 379/88 |

OTHER PUBLICATIONS

Brochure for "Phone Blaster™", Creative Labs, Inc., Milpitas, CA 95035; Apr. 1995.
Brochure for "Modem Blaster™", Creative Labs, Inc., Milpitas, CA 95035; Apr. 1995.

Primary Examiner—Ahmad F. Matar
Assistant Examiner—Scott Wolinsky
Attorney, Agent, or Firm—Townsend and Townsend and Crew LLP

[57] ABSTRACT

An add-on card and connector including telephone functions is provided. The telephone functions are ones which are unlikely to be eventually performed on a mother board. A connection is provided which is adaptable to either an add-on sound card or eventually a mother board. The interface connection allows the use of the sound board to generate hold music for phone functions, as well as provide text to speech functions. In addition, the sharing of a common microphone and speaker is provided for.

18 Claims, 4 Drawing Sheets

OPTIMIZED INTERFACE BETWEEN AUDIO/MODEM BOARD AND SOUND BOARD

BACKGROUND OF THE INVENTION

The present invention relates to add-on sound boards for generating and manipulating sounds with a computer, and to boards adding telephone interface capabilities.

Sound boards, such as the Sound Blaster™ products from Creative Labs, have become a popular add-on board for personal computers. Different sound boards have different components, but generally they add the ability to produce sound which can be used for prompts or otherwise in ordinary computer programs, or as sound for video games played on a computer. Such sound boards will often provide an interface to a CD-ROM player which can play music CD-ROMs or video and music CD-ROMs. Sound boards may include a chip for generating music independently of a CD, circuits for interconnecting with the computer, and circuitry for processing sounds and mixing sounds. Typically, this is done by converting the sounds into digital form, and then doing the processing in the digital domain, often with a digital signal processor. The sound board will also include various connections, such as a speaker output connection, a microphone input connection, and a line in or line out connection for connecting to other audio equipment. In addition, a joystick or a musical instrument digital interface (MIDI) port may be included.

A different type of an add-on board for a personal computer has been provided recently to allow faxing and modem connections through a telephone, thus giving desktop faxing capabilities. Modem boards have been around for some time, with fax boards in a PC being more recent. Most recently, multiple functions which interconnect over a phone have been combined on a single board, such as the Phone Blasters™ board from Creative Labs. This not only provides the capability for faxing and for sending data over a modem connection, but also provides the capability of doing voice conversations over the phone, with the board including a connection to a speaker and a microphone for allowing a speakerphone function through the computer. In addition, voice-mail capability can be provided. Such a product may also include a connection to a CD-ROM player or to an on-board sound synthesis chip, allowing the integration of sound generation and manipulation with the other phone functions. For instance, sound generation can be used to generate hold music for incoming phone calls.

One of the difficulties for today's computer user is the wide variety of add-on boards available and their cost. In addition, as integrated semiconductor technology becomes more advanced, more and more functions are combined onto a single board or onto the mother board of the computer (containing the microprocessor for the computer). Recently, more advanced microprocessors include digital signal processing functions, allowing them to do functions that were previously relegated to add-on boards.

In addition to the multiplicity of boards, there is also duplication. For instance, a Sound Blaster™ board and a Phone Blaster™ board both include sound generation chips. Accordingly, it would be desirable to provide a division of functions between add-on boards and mother boards which allows for different uses, while also allowing for adding on additional features without duplication. In addition, it would be desirable to have such a division of components with appropriate interfaces be upgradable and compatible with an eventual migration of more functions to a computer mother board.

SUMMARY OF THE INVENTION

The present invention provides an add-on card and connector including telephone functions. The telephone functions are ones which are unlikely to be eventually performed on a mother board. A connection is provided which is adaptable to either an add-on sound card or eventually a mother board. The interface connection allows the use of the sound board to generate hold music for phone functions, as well as provide text to speech functions. In addition, the sharing of a common microphone and speaker is provided for.

In particular, the telephone interface card of the present invention provides a telephone hybrid circuit, which may vary from country to country depending upon the telephone requirements. A modem circuit is also included, along with a number of multiplexing circuits for providing different combinations of functions to the telephone line, such as fax, data, voice from a microphone, or sound generated from the sound card. The phone board also includes analog-to-digital and digital-to-analog converters and a digital signal processing circuit for manipulating telephone line signals, in particular for providing echo cancellation in connection with a speakerphone function.

The connector itself provides line-in connections, ground connections, a modem-speaker connection, and a microphone-in connection between the sound board and the add-on telephone interface board.

The present invention thus provides an optimum division between an audio board and a modem/phone board which is well integrated and usable. The telephone interface can be connected to a sound board to provide telephone functionality with minimal cost. When connected to a sound board or a mother board, the additional capabilities of hold music, voice recognition, and text-to-speech are provided for. The connection is simple and allows the board to be added on by simply using a cable connection.

For a further understanding of the nature and advantages of the invention, reference should be made to the ensuing detailed description taken in conjunction with the accompanying drawings.

DESCRIPTION OF THE PREFERRED EMBODIMENT

Figure 1:
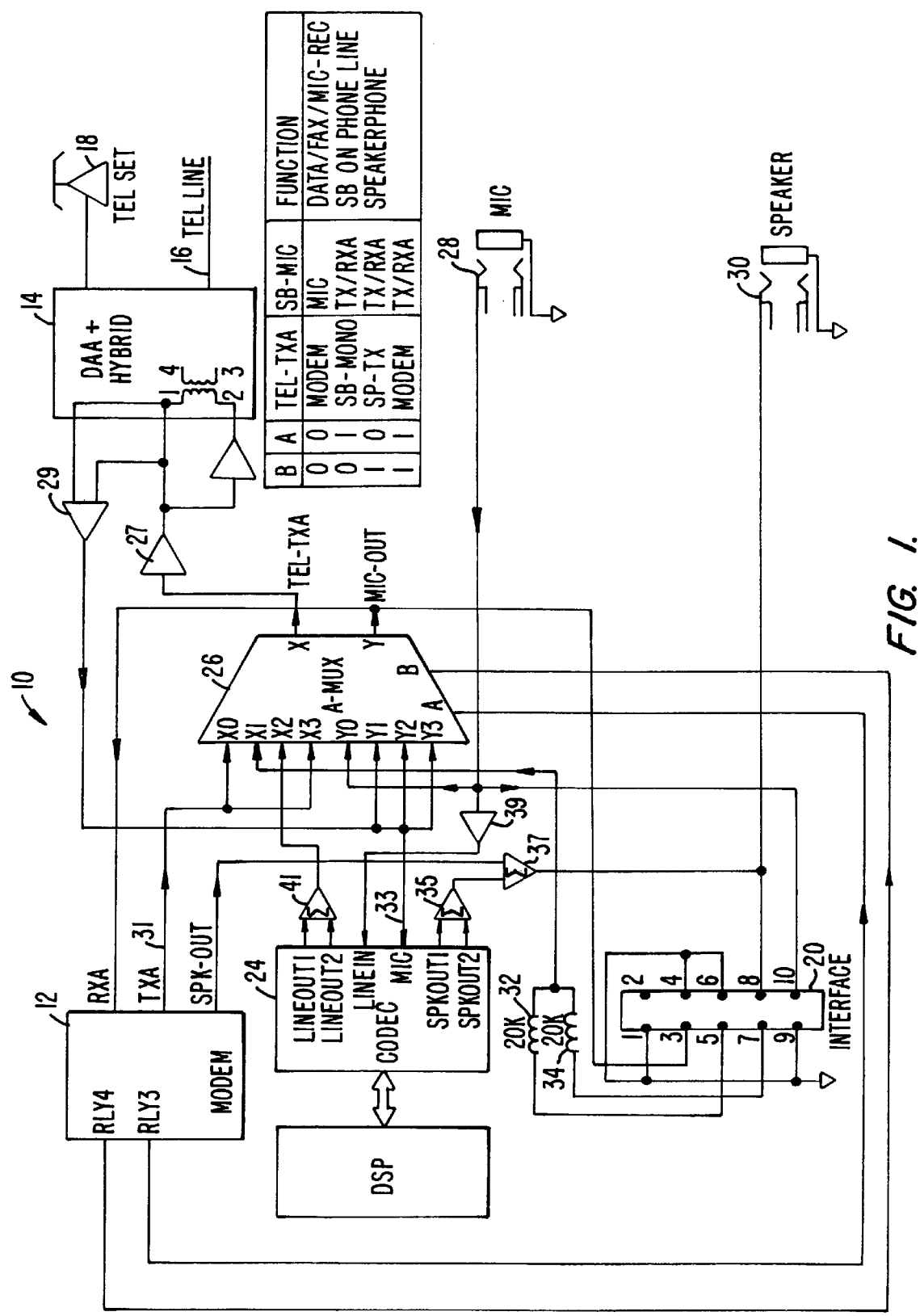
FIG. 1 is a block diagram of a phone interface board according to the present invention.

FIG. 1 is a block diagram of one embodiment of a telephone interface card according to the present invention. The board includes a modem 12 and a DAA (Direct Analog Access) and hybrid chip 14 providing an interface to a telephone line 16 and a telephone handset 18. An interface connector 20 to an add-on sound card or a mother board is provided. In addition, the board includes a digital signal processing chip 22 along with a corresponding CODEC 24 for performing analog-to-digital and digital-to-analog conversion. A multiplexer 26 allows the selective interconnection of different functions to and from the phone line. Also provided is a connector 28 for a microphone and a connector 30 for speakers.

Interface connector 20 is a 10-pin connector with two rows of 5 pins. Multiple pins 1, 4, 6 and 9 are connected to an analog ground. Pin 2 is a key way pin which is flat instead of circular in order to ensure that the connector is inserted in the proper orientation. Pin 3 is a line-in pin connected to one output of multiplexer 26 which allows a line in signal to be provided to the sound card.

Pins 5 and 7 are the left and right line-out channels from the sound card which are combined into one signal using resistors 32 and 34 to provide the X1 input of multiplexer 26. Pin 8 is connected to the speaker port 30, and also provides an interconnection through the connector interface 20 to the speaker input of the sound card. Pin 10 is a microphone input pin which allows the microphone input signal from microphone connector 28 to be provided to the sound card. The microphone signal is also provided to the Y0 input of multiplexer 26.

Figure 2:
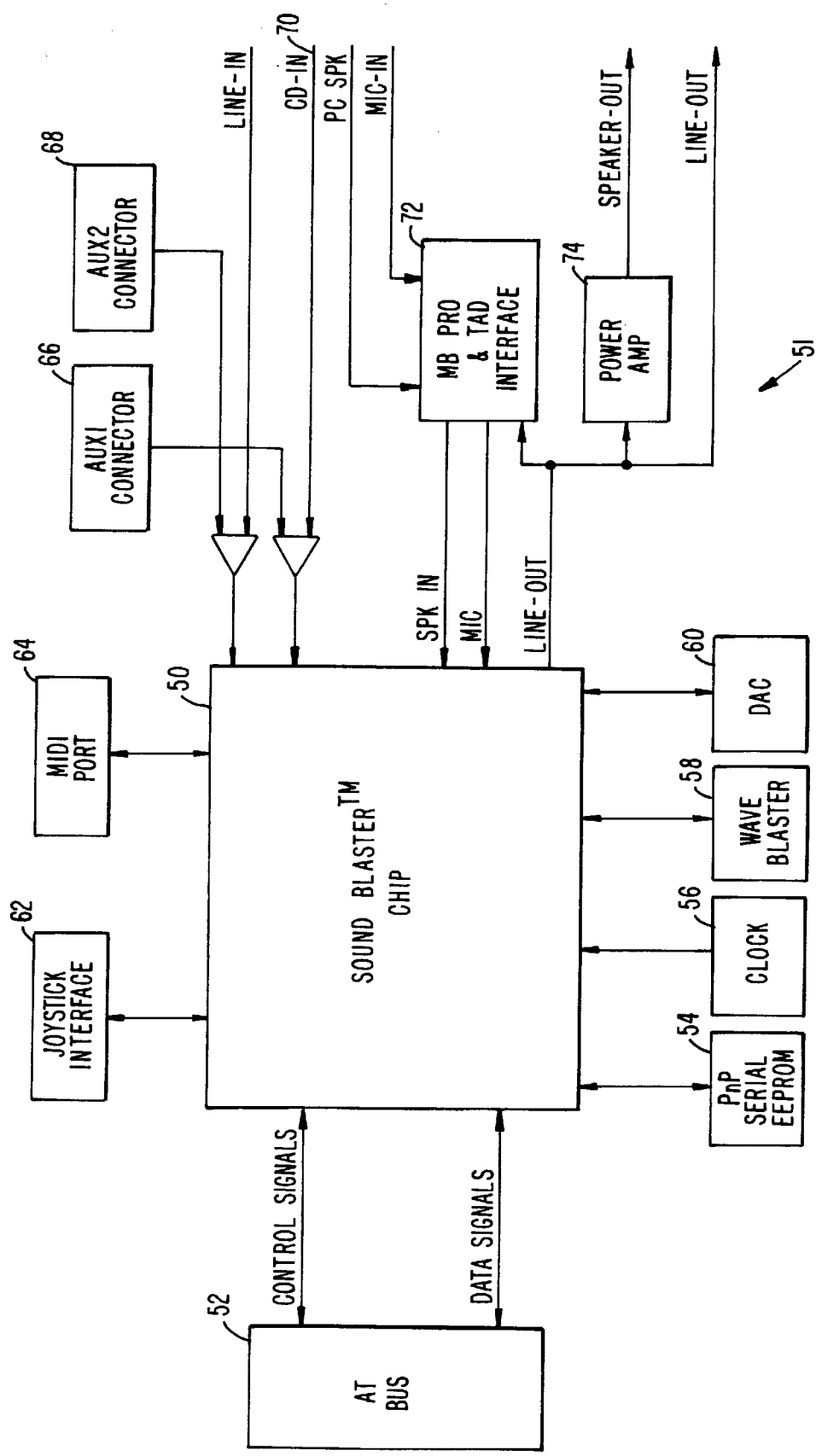
FIG. 2 is a block diagram of one embodiment of a sound board which can connect to the present invention.

FIG. 2 is a block diagram of one embodiment of an add-on sound card for connecting to the telephone interface card of the present invention. The center of the sound card is a sound chip 50, or series of chips which perform various sound-generation and processing functions. In addition, an interface to an AT bus 52 is also provided by chip 50. Instead of a single chip 50, multiple chips could be included, such as an FM synthesis chip for generating music, a bus interface chip for interfacing with AT bus 52, a CODEC for converting signals from analog-to-digital form and back again, a mixer chip for mixing sounds from different sources, and one or more digital sound processors for manipulating sound data in the digital domain.

Also shown is a serial EEPROM 54 which contains the program for operating the chip 50. In addition, a clock 56 is provided. There are also various connectors, such as a connector 58 for a Wave Blaster™ add-on board which provides digital sounds samples for better sound generation. A separate chip 60 provides digital-to-analog conversion.

Multiple interfaces are provided, such a joystick interface 62 and a MIDI port 64 along with two auxiliary interfaces 66 and 68. A CD-ROM input is provided on lines 70, and an interface 72 provides a simple speaker and microphone interface. Finally, a power amplifier 74 is provided.

Figure 3:
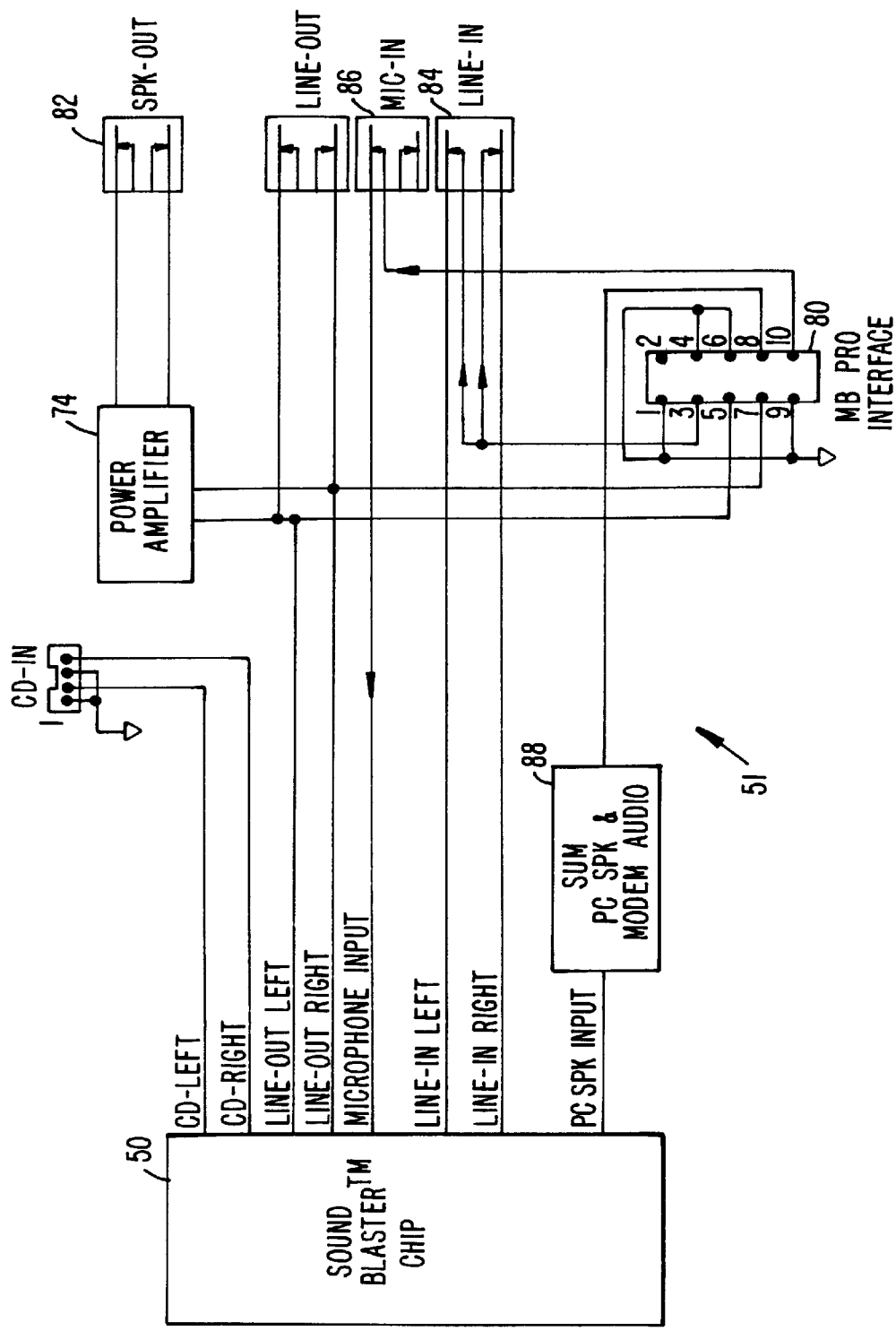
FIG. 3 is a diagram of the interconnections to the connector on the sound board of FIG. 2.

FIG. 3 illustrates more detailed interconnections on the sound card of FIG. 2. In particular, an interface connector 80 which will connect to connector 20 of FIG. 1 via a cable, is shown. As can be seen, pins 5 and 7 are connected to the left and right line-out pins of chip 50. These can be provided through power amplifier 74 to a speaker output connector 82 on the sound card, or through pins 7 and 9 to the telephone line on the telephone interface card of FIG. 1. Pin 3 provides a connection from the add-on telephone board in FIG. 1 to the line-in input of chip 50, which can also be provided through a line-in connector 84. The microphone-in connection of chip 50 is provided either from an input port 86 on the sound board or from a pin 10 of connector 80. Finally, pin 8 of connector 80, which is the speaker line of the phone card, is provided through a summing circuit 88 to the PC speakerphone input of chip 50.

Figure 4:
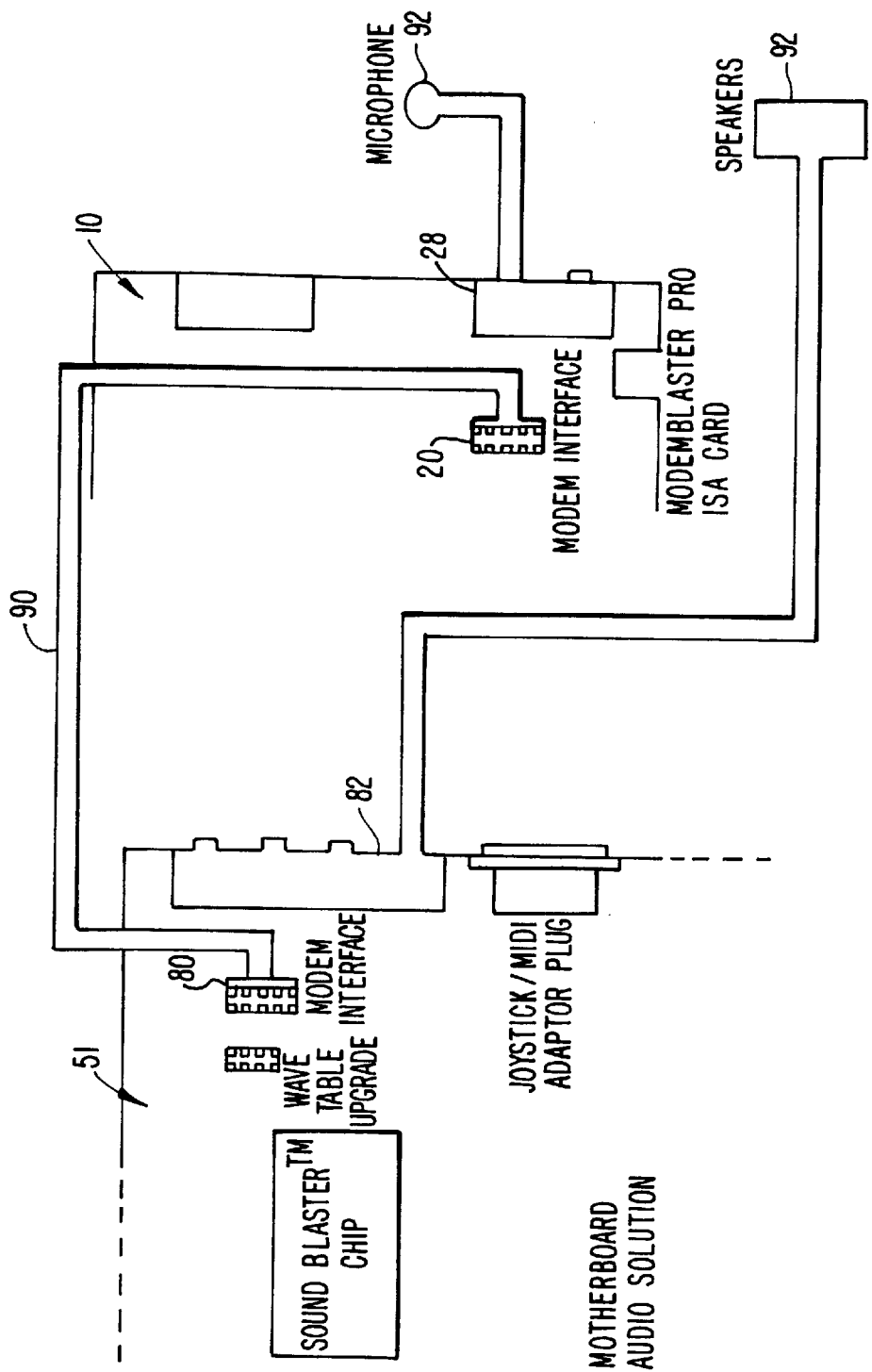
FIG. 4 is a diagram illustrating the microphone and speaker connections using the add-on telephone interface board of the present invention.

FIG. 4 illustrates the typical connection of the speakers and microphone when the telephone interface card 10 of FIG. 1 is connected to add-on sound board 51 of FIGS. 2 and 3. Alternately, a mother board may be used rather than sound board 51. A cable 90 is shown connecting connector 80 on the sound board to connector 20 on the phone interface board. A microphone 92 is connected to the microphone input 28 of the phone interface board 10, while speakers 92 are connected to the speaker output connector 82 of sound board 51.

A better understanding of the advantages of the invention can be obtained by describing the connections used for various functions of the phone-interface board.

Data Modem

In order to send data over a modem, the data is provided from the PC along AT bus 52 through sound chip 50 to the line-out lines connected to pins 5 and 7 of the connector. This data is then provided through the X1 input of multiplexer 26 and fed through buffer 27 and then through a feedback path of buffer 29 back to the Y1, Y2 and Y3 inputs of multiplexer 26. The Y output is then connected to the receive input of modem 12, which then modulates and transmits data on its transmit output connected to pins X0 and X3 of multiplexer 26. The X input is then provided through buffer 27 to telephone chip 14 to be provided over phone lines 16.

Data received back during a modem connection is provided through buffer 29 to the Y1–Y3 inputs of multiplexer 26, and then to the receive input of modem 12. The received data can then be provided through the transmit output pin 31 of modem 12 to multiplexer 26, then cycled from the X output throught buffers 27 and 29 to the Y inputs, with the Y output being connected to pin 3 of interface 20. Pin 3 of interface 80 on the sound card portion shown in FIG. 3 is connected to the line-in inputs of chip 50, where it can be provided to the PC over AT bus 52, as shown in FIG. 2.

A fax transmission occurs using the same data patterns as indicated for the modem transmission.

Speakerphone

A speakerphone application can be provided by taking voice signals from line 16 through chip 14 and buffer 29 to multiplexer 26, where they are provided to the microphone input 33 of CODEC 24. The voice can be converted into digital form and provided to DSP 22 for echo cancellation, and then provided through the speaker-out lines of CODEC 24 to a combining circuit 35 and then through a second combining circuit 37 where they are provided either to speaker 30 or to pin 8 of the connector from which they can be connected to the PC speaker input through combining circuit 88 on the sound card, as shown in FIG. 3.

The microphone input 28 is connected to a microphone as shown in FIG. 4, and the input signal is provided through a buffer 39 to a line-in of CODEC 24. Again, this voice signal can be converted into digital form and echo cancellation and other functions performed in DSP 22, with the resulting signal being converted back to analog form and provided on the line-out pins of CODEC 24 to a combining circuit 41. Combining circuit 41 connects its output to the X2 input of multiplexer 26, from which it is provided through buffer 27 and through chip 14 back to telephone line 16.

If it is desired to provide hold music during a voice telephone session, this can be provided from sound chip 50 of FIG. 3 through line-out pins 5 and 7 to the X1 input of multiplexer 26, from which it is provided through buffer 27 and chip 14 to the telephone line 16. Similarly, text-to-speech can be provided using the same path, with the text-to-speech conversion being provided by the PC through AT bus 52 to chip 50, as shown in FIG. 2.

Voice recognition can be performed by using the voice input from the telephone line and providing it through pin 3 of the connector to the line-in input of sound chip 50 of FIG. 3.

As will be understood by those of skill in the art, the present invention may be embodied in other specific forms without departing from the spirit and essential characteristics thereof. For example, the CODEC and DSP of FIG. 1 could be eliminated, and instead direct connections made without echo cancellation or have echo cancellation done on the host CPU. Alternately, different types of multiplexing circuits could be used to provide the same connections set forth in FIG. 1. A combining circuit other than the resistors 32 and 34 could be used, for example, or the other combining circuits could be done in a different manner. Accordingly, reference should be made to the appended claims for a description of the scope of the invention.

What is claimed is:

1. A telephone interface card for connecting to a sound board, said sound board including a left line-out channel and a right line-out channel, said telephone interface card comprising:
   a telephone hybrid circuit, coupled to a telephone line;
   a modem circuit having a transmit port and a receive port;
   an interface connector for connecting to said sound board, said interface connector including a line-in pin, a line-left pin for connection to said left line-out channel, a line-right pin for connection to said right line-out channel, a ground pin, a modem-speaker pin and a microphone-in pin;
   a combining circuit, having first and second inputs coupled to said line-left and line-right pins, and a combined-line output;
   a first multiplexing circuit having a first input coupled to said combined-line output and a second input coupled to said transmit port and an output coupled to an input of said telephone hybrid circuit;
   a second multiplexing circuit having inputs coupled to an output of said telephone hybrid circuit and said microphone-in pin, and an output coupled to said receive port and said line-in pin;
   a microphone connector coupled to said microphone-in pin; and
   a speaker connector coupled to said modem-speaker pin.

2. The telephone interface card of claim 1 wherein said interface connector is a ten pin connector arranged in two rows of 5 pins, comprising:
   a first pin in a first row being a ground pin;
   a second pin in said first row being a line-in pin;
   a third pin in said first row being a line-left pin;
   a fourth pin in said first row being a line-right pin;
   a fifth pin in said first row being a ground pin;
   a first pin in said second row being a key pin with a flat shape, the remainder of said pins being cylindrical;
   a second pin in said second row being a ground pin;
   a third pin in said second row being a ground pin;
   a fourth pin in said second row being a modem-speaker pin; and
   a fifth pin in said second row being a microphone-in pin.

3. The telephone interface card of claim 1 further comprising:
   first means for providing said output of said telephone hybrid circuit to said modem-speaker pin; and
   second means for providing a connection from said microphone connector and said microphone-in pin to a third input of said first multiplexing circuit.

4. The telephone interface card of claim 3 wherein said first means for providing comprises:
   an analog to digital converter coupled to said output of said telephone hybrid circuit;
   a digital processing circuit coupled to said analog to digital converter for performing digital echo cancellation; and
   a digital to analog converter coupled between said digital processing circuit and said modem-speaker pin.

5. The telephone interface card of claim 3 wherein said second means for providing comprises:
   an analog to digital converter coupled to said connection from said microphone connector and said microphone-in pin;
   a digital processing circuit coupled to said analog to digital converter for performing digital echo cancellation; and
   a digital to analog converter coupled between said digital processing circuit and said third input of said first multiplexing circuit.

6. The telephone interface card of claim 5 wherein said analog to digital converter and said digital to analog converter are part of a codec chip.

7. The telephone interface card of claim 6 wherein said modem circuit has a speakerphone output, and further comprising a second combining circuit having inputs coupled to said speakerphone output and a speaker output of said codec chip, said second combining circuit having an output connected to said modem-speaker pin and said speaker connector.

8. The telephone interface card of claim 1 wherein said sound card is a computer motherboard.

9. The telephone interface card of claim 1 further comprising a feedback buffer coupling an input of said telephone hybrid circuit to an input of said second multiplexing circuit.

10. A telephone interface card for connecting to a sound board, said sound board including a left line-out channel and a right line-out channel, said telephone interface card comprising:
   a telephone hybrid circuit, coupled to a telephone line;
   a modem circuit having a transmit port and a receive port;
   a ten pin connector arranged in two rows of 5 pins consisting of;
      a first pin in a first row being a ground pin;
      a second pin in said first row being a line-in pin;
      a third pin in said first row being a line-left pin for connection to said left line-out channel;
      a fourth pin in said first row being a line-right pin for connection to said right line-out channel;
      a fifth pin in said first row being a ground pin;
      a first pin in said second row being a key pin with a flat shape, the remainder of said pins being cylindrical;
      a second pin in said second row being a ground pin;
      a third pin in said second row being a ground pin;
      a fourth pin in said second row being a modem-speaker pin; and
      a fifth pin in said second row being a microphone-in pin;
   a combining circuit, having first and second inputs coupled to said line-left and line-right pins, and a combined-line output;
   a first multiplexing circuit having a first input coupled to said combined-line output and a second input coupled to said transmit port and an output coupled to an input of said telephone hybrid circuit;
   a second multiplexing circuit having inputs coupled to an output of said telephone hybrid circuit and said microphone-in pin, and an output coupled to said receive port and said line-in pin;

a microphone connector coupled to said microphone-in pin; and a speaker connector coupled to said modem-speaker pin.

11. The telephone interface card of claim 10 further comprising:

first means for providing said output of said telephone hybrid circuit to said modem-speaker pin; and second means for providing a connection from said microphone connector and said microphone-in pin to a third input of said first multiplexing circuit.

12. The telephone interface card of claim 11 wherein said first means for providing comprises:

an analog to digital converter coupled to said output of said telephone hybrid circuit;

a digital processing circuit coupled to said analog to digital converter for performing digital echo cancellation; and a digital to analog converter coupled between said digital processing circuit and said modem-speaker pin.

13. The telephone interface card of claim 11 wherein said second means for providing comprises:

an analog to digital converter coupled to said connection from said microphone connector and said microphone-in pin;

a digital processing circuit coupled to said analog to digital converter for performing digital echo cancellation; and a digital to analog converter coupled between said digital processing circuit and said third input of said first multiplexing circuit.

14. A telephone interface card for connecting to a sound board, said sound board including a left line-out channel and a right line-out channel, said telephone interface card comprising:

a telephone hybrid circuit, coupled to a telephone line;

a modem circuit having a transmit port and a receive port;

a ten pin connector arranged in two rows of 5 pins consisting of:

a first pin in a first row being a ground pin;

a second pin in said first row being a line-in pin;

a third pin in said first row being a line-left pin for connection to said left line-out channel;

a fourth pin in said first row being a line-right pin for connection to said right line-out channel;

a fifth pin in said first row being a ground pin;

a first pin in said second row being a key pin with a flat shape, the remainder of said pins being cylindrical;

a second pin in said second row being a ground pin;

a third pin in said second row being a ground pin;

a fourth pin in said second row being a modem-speaker pin; and a fifth pin in said second row being a microphone-in pin;

a combining circuit, having first and second inputs coupled to said line-left and line-right pins, and a combined-line output;

a first multiplexing circuit having a first input coupled to said combined-line output and a second input coupled to said transmit port and an output coupled to an input of said telephone hybrid circuit;

a second multiplexing circuit having inputs coupled to an output of said telephone hybrid circuit and said microphone-in pin, and an output coupled to said receive port and said line-in pin;

a microphone connector coupled to said microphone-in pin;

a speaker connector coupled to said modem-speaker pin;

first means for providing said output of said telephone hybrid circuit to said modem-speaker pin, said first means for providing including an analog to digital converter coupled to said output of said telephone hybrid circuit, a digital processing circuit coupled to said analog to digital converter for performing digital echo cancellation, and a digital to analog converter coupled between said digital processing circuit and said modem-speaker pin; and second means for providing a connection from said microphone connector and said microphone-in pin to a third input of said first multiplexing circuit, said second means for providing including said analog to digital converter coupled to said connection from said microphone connector and said microphone-in pin, said digital processing circuit coupled to said analog to digital converter for performing digital echo cancellation, and said digital to analog converter coupled between said digital processing circuit and said third input of said first multiplexing circuit.

15. The telephone interface card of claim 14 wherein said analog to digital converter and said digital to analog converter are part of a codec chip.

16. The telephone interface card of claim 15 wherein said modem circuit has a speakerphone output, and further comprising a second combining circuit having inputs coupled to said speakerphone output and a speaker output of said codec chip, said second combining circuit having an output connected to said modem-speaker pin and said speaker connector.

17. The telephone interface card of claim 14 wherein said sound card is a computer motherboard.

18. The telephone interface card of claim 14 further comprising a feedback buffer coupling an input of said telephone hybrid circuit to an input of said second multiplexing circuit.

* * * * *